United States Patent
Kim (10) Patent No.: US 9,930,269 B2
(45) Date of Patent: Mar. 27, 2018

(54) APPARATUS AND METHOD FOR PROCESSING IMAGE IN DEVICE HAVING CAMERA

(71) Applicant: Samsung Electronics Co., Ltd, Gyeonggi-do (KR)

(72) Inventor: Kyunghwa Kim, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/146,573

(22) Filed: Jan. 2, 2014

(65) Prior Publication Data

US 2014/0185957 A1 Jul. 3, 2014

(30) Foreign Application Priority Data

Jan. 3, 2013 (KR) .................. 10-2013-0000460

(51) Int. Cl.
| | |
|---|---|
| *G06K 9/46* | (2006.01) |
| *H04N 5/262* | (2006.01) |
| *G06K 9/00* | (2006.01) |
| *G06T 11/00* | (2006.01) |

(52) U.S. Cl.
CPC ....... *H04N 5/2628* (2013.01); *G06K 9/00228* (2013.01); *G06T 11/00* (2013.01)

(58) Field of Classification Search
CPC ....... G06T 5/00; G06T 11/00; G06K 9/00228; H04N 5/2628
USPC .................. 382/282, 283, 284, 199, 165; 348/231.99, 345, 620
See application file for complete search history.

(56) References Cited

U.S. PATENT DOCUMENTS

| | | | | |
|---|---|---|---|---|
| 5,786,846 A * | 7/1998 | Hiroaki | .................. | H04N 7/142 348/14.16 |
| 6,035,074 A | 3/2000 | Fujimoto et al. | | |
| 6,654,506 B1 * | 11/2003 | Luo | ....................... | G06K 9/3233 345/620 |
| 7,209,149 B2 * | 4/2007 | Jogo | ............................. | 345/622 |
| 7,528,846 B2 * | 5/2009 | Zhang | ................. | H04N 7/0122 345/619 |
| 7,643,704 B2 * | 1/2010 | Jackson | ............... | H04N 1/3873 382/266 |
| 8,116,535 B2 | 2/2012 | Nozawa | | |
| 8,971,662 B2 * | 3/2015 | Fukata | .................... | G06T 11/60 382/282 |
| 9,213,460 B2 * | 12/2015 | Nurse | ..................... | G06F 3/048 |

(Continued)

FOREIGN PATENT DOCUMENTS

| | | |
|---|---|---|
| CN | 102215336 A | 10/2011 |
| JP | 10-334213 | 12/1998 |
| JP | 2008-027401 | 2/2008 |

OTHER PUBLICATIONS

Extended European Search Report dated Mar. 25, 2014 in connection with European Patent Application No. 13199633.2-1902, 6 pages.

(Continued)

*Primary Examiner* — Meknen Bekele (57) ABSTRACT

A method of cropping an image in an apparatus having a camera includes displaying an image, identifying a face area in the image if a crop mode is selected, setting and displaying a crop mark including the identified face area, and displaying a crop image by cropping an image in the crop mark if a crop execution is requested.

18 Claims, 12 Drawing Sheets

(56) References Cited

U.S. PATENT DOCUMENTS

| | | | | |
|---|---|---|---|---|
| 9,646,131 B2* | 5/2017 | Goldberg | ............... | G06Q 10/10 |
| 2001/0048447 A1* | 12/2001 | Jogo | ............... | G06T 11/60 |
| | | | | 345/620 |
| 2002/0030634 A1* | 3/2002 | Noda | ............... | G06T 11/60 |
| | | | | 345/5 |
| 2002/0113862 A1* | 8/2002 | Center, Jr. | ............... | H04N 7/148 |
| | | | | 348/14.08 |
| 2002/0191861 A1* | 12/2002 | Cheatle | ............... | G06K 9/38 |
| | | | | 382/282 |
| 2004/0252286 A1* | 12/2004 | Murray et al. | ............... | 355/28 |
| 2005/0025387 A1* | 2/2005 | Luo | ............... | G06T 7/11 |
| | | | | 382/298 |
| 2005/0117049 A1* | 6/2005 | Suzuki | ............... | 348/345 |
| 2006/0139371 A1* | 6/2006 | Lavine | ............... | G06F 3/14 |
| | | | | 345/620 |
| 2006/0188173 A1* | 8/2006 | Zhang | ............... | H04N 7/0122 |
| | | | | 382/276 |
| 2006/0193509 A1* | 8/2006 | Criminisi | ............... | G06K 9/00241 |
| | | | | 382/154 |
| 2007/0065136 A1* | 3/2007 | Lakey | ............... | 396/287 |
| 2007/0258012 A1* | 11/2007 | Miller | ............... | H04N 7/0122 |
| | | | | 348/581 |
| 2009/0190835 A1* | 7/2009 | Lee | ............... | 382/190 |
| 2009/0316990 A1* | 12/2009 | Nakamura et al. | ............... | 382/173 |
| 2010/0119172 A1* | 5/2010 | Yu | ............... | G06T 5/006 |
| | | | | 382/256 |
| 2010/0201789 A1* | 8/2010 | Yahagi | ............... | 348/51 |
| 2010/0225669 A1* | 9/2010 | Park | ............... | G09G 5/005 |
| | | | | 345/661 |
| 2010/0231609 A1* | 9/2010 | Chatting | ............... | G06T 3/0012 |
| | | | | 345/660 |
| 2010/0232704 A1* | 9/2010 | Thorn | ............... | G06F 3/04845 |
| | | | | 382/195 |
| 2010/0329550 A1* | 12/2010 | Cheatle | ............... | G06T 11/60 |
| | | | | 382/165 |
| 2011/0075016 A1* | 3/2011 | Shimizu | ............... | 348/345 |
| 2011/0090246 A1* | 4/2011 | Matsunaga | ............... | 345/620 |
| 2011/0090248 A1* | 4/2011 | Xiang | ............... | H04M 1/72544 |
| | | | | 345/628 |
| 2011/0205383 A1* | 8/2011 | Shah | ............... | H04N 5/232 |
| | | | | 348/222.1 |
| 2011/0211073 A1* | 9/2011 | Foster | ............... | H04N 5/232 |
| | | | | 348/164 |
| 2011/0242347 A1 | 10/2011 | Kinoshita | | |
| 2012/0287164 A1* | 11/2012 | Koh | ............... | G06T 3/0012 |
| | | | | 345/667 |
| 2013/0108166 A1* | 5/2013 | Ptucha | ............... | G06T 11/60 |
| | | | | 382/195 |
| 2013/0108171 A1* | 5/2013 | Ptucha | ............... | G06K 9/00228 |
| | | | | 382/195 |
| 2014/0040821 A1* | 2/2014 | Carlsson | ............... | G06F 3/04845 |
| | | | | 715/800 |
| 2014/0068499 A1* | 3/2014 | Yoo | ............... | G06F 3/0488 |
| | | | | 715/781 |
| 2014/0176756 A1* | 6/2014 | Yoon | ............... | 348/222.1 |
| 2014/0184849 A1* | 7/2014 | Kim | ............... | 348/231.99 |
| 2015/0271464 A1* | 9/2015 | Suh | ............... | H04N 13/0007 |
| | | | | 375/240.16 |
| 2016/0261790 A1* | 9/2016 | Lee | ............... | H04N 5/23216 |

OTHER PUBLICATIONS

Foreign Communication from Related Counterpart Application; Chinese Patent Application No. 201410003848.X; First Office Action dated Sep. 29, 2017; 24 pages.

* cited by examiner

APPARATUS AND METHOD FOR PROCESSING IMAGE IN DEVICE HAVING CAMERA

CROSS-REFERENCE TO RELATED APPLICATION(S) AND CLAIM OF PRIORITY

The present application is related to and claims the benefit under 35 U.S.C. § 119(a) of a Korean patent application filed on Jan. 3, 2013 in the Korean Intellectual Property Office and assigned Serial No. 10-2013-0000460, the entire disclosure of which is hereby incorporated by reference.

TECHNICAL FIELD

The present disclosure relates to an apparatus and method for processing an image in a camera device or portable terminal having a camera and, more particularly, to an apparatus and method for cropping an image.

BACKGROUND

A camera device or portable terminal having a camera takes a photo by using an installed camera, and may edit the photo to have only the desired subject by cropping a portion of the photo, if an undesired person, animal or obstacle is included in the photo. Further, if the photo is not correctly leveled (i.e., if a person is photographed in a skewed position), the cropping may be used to adjust the level of photo. Here, the cropping means cutting out a portion of the image. Namely, the cropping means trimming an image into a desired size or cutting out an undesired portion of the image.

Generally, a user takes a photo by using a camera device or portable terminal having a camera, and crops the photo by using an image editing program, such as PHOTOSHOP, in a computer. However, the above method of cropping requires an additional image editing program, and has inconveniences of manual cropping.

The camera device or portable terminal having a camera can be provided with various editing programs including a crop program. However, the camera device or portable terminal having a camera generally provides a crop area (default area) having an identical area and size regardless of the number of persons. The reason for cropping a personal photo is to edit a photo centered on a person. When cropping in a default area of the camera or portable terminal having a camera, a portion of a face may be cut off, and when cropping a photo including more than one person, it is difficult to edit the photo to a desired shape.

SUMMARY

To address the above-discussed deficiencies, the present disclosure provides an apparatus and method for cropping a personal photo by recognizing a face area of person and setting a crop area centered in the recognized face area when photographing with a camera device or portable terminal having a camera. The present disclosure further provides an apparatus and method for cropping a photo by setting a crop area so that faces of each person are included in the crop area, if more than one person is included in the photo.

The present disclosure provides a method for cropping an image in an apparatus having a camera. The method includes displaying an image; identifying a face area in the image if a crop mode is selected; setting and displaying a crop mark including the identified face area; and displaying a crop image by cropping an image in the crop mark if a crop execution is requested.

If a plurality of face areas is identified, the setting a crop mark in the apparatus having a camera can further include displaying each of the identified face areas, and setting and displaying the crop mark by connecting an imaginary line circumscribing the displayed face areas.

The present disclosure provides an apparatus having a camera including a display unit configured to display an image; an input unit configured to generate signals for a crop mode and crop execution; and a control unit configured to identify a face area in the displayed image if a signal for crop mode is detected, to set and display a crop mark including the identified face area in the displayed image, and to display a crop image by cropping an image in the crop mark if a signal for crop execution is detected.

If a plurality of face areas is identified, the control unit can display each of the identified face areas, and set and display the crop mark by connecting an imaginary line circumscribing the displayed face areas.

When cropping a personal photo in an apparatus having a camera, a person in the photo is identified and a crop mark is set to include a face of the person, and an image in the set crop mark is cropped. Accordingly, the method for cropping an image according to the present disclosure generates a crop image centered in a face area of the person included in a personal photo, and crops the image by setting the crop mark to include face areas of each person in the case that more than one person is included in the photo.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Hereinafter, embodiments of the present disclosure are described in detail with reference to the accompanying drawings. The same reference symbols are used throughout the drawings to refer to the same or like parts. Detailed descriptions of well-known functions and structures incorporated herein may be omitted to avoid obscuring the subject matter of the present disclosure.

The present disclosure relates to an apparatus and method for cropping a personal photo in a camera device and portable terminal having a camera. Generally, it is preferable to edit an image centered in a face when cropping a personal photo. Accordingly, a method of setting a crop area without cutting out a face is required when setting a crop area of the personal photo, and the crop area should be set to cover all the faces of each person if more than one person is included in the photo.

Generally, cropping means adjusting an image size to a desired scale when editing a photo or picture. A line drawn to display a crop area in an image for cropping is called crop mark, and a cut off portion of the image is called a cropped area.

The present disclosure provides a method of setting a crop mark so that a person in a photo is identified and a face of the identified person is included when cropping the photo in a camera device and/or portable terminal having a camera. Hereafter, the description will be made based on a camera device for conveniences. The above embodiment of the present disclosure provides a method of cropping an image by setting a crop mark so that all the face areas of each person are included, if more than one person is included in the photo.

Figure 1:
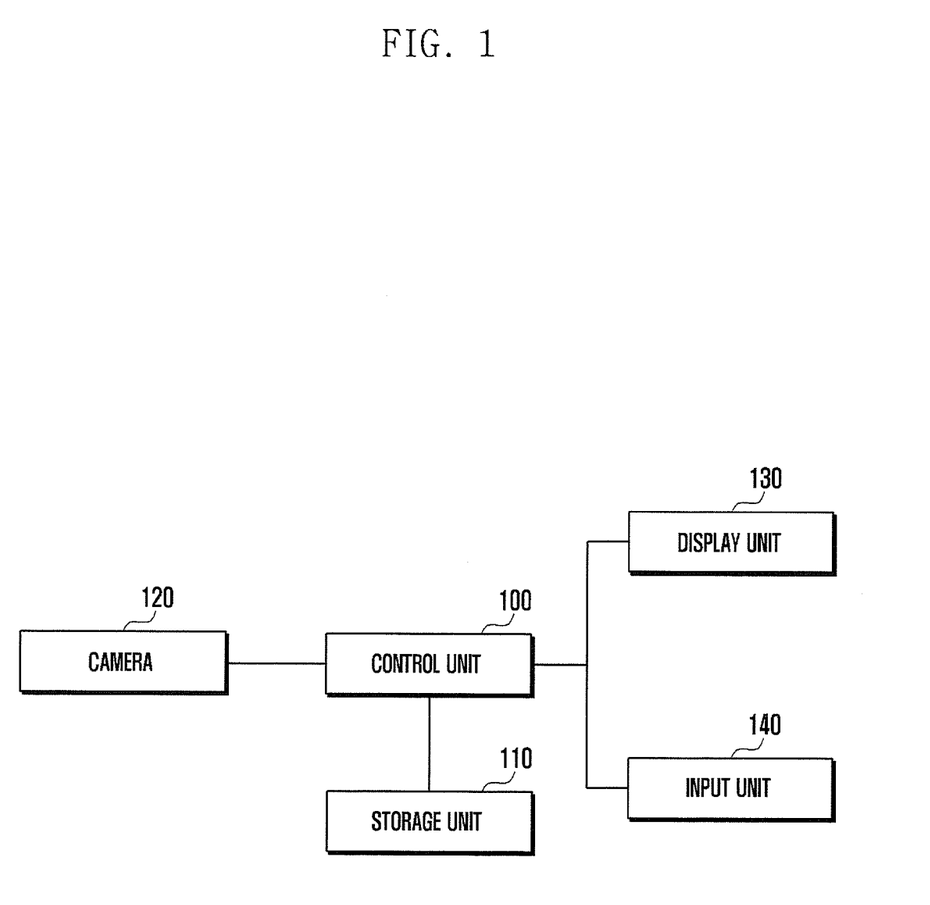
FIG. 1 illustrates a block diagram of a configuration of camera device according to embodiments of the present disclosure.

FIG. 1 illustrates a block diagram of a configuration of camera device according to embodiments of the present disclosure.

Referring to FIG. 1, a control unit 100 controls the general operation of camera device. Further, the control unit 100 identifies a face of person when cropping a photo, decides the number of persons included in the photo, sets a crop mark so as to include faces of each person, and controls to crop the photo by displaying the set crop mark in the photo.

A camera 120 photographs a still image and moving image under the control of the control unit 100. A storage unit 110 includes a program memory storing an operating program of the camera device and a program according to the embodiment of the present disclosure, and a data memory storing photographed images. The storage unit 110 further stores a moving image and still image under the control of the control unit 100, and an image cropped in a crop mode.

A display unit 130 displays a photographed image under the control of the control unit 100. The display unit 130 can be configured with an LCD or OLED. An input unit 140 generates input signals for controlling the photographing operation of the camera device. Here, the display unit 130 and the input unit 140 can be integrated into a touch screen.

In a camera device having the above configuration according to an embodiment of the present disclosure, the control unit 100 identifies a person in a photo, and sets a crop mark so that the face of the identified person is included in the photo displayed in the display unit 130 when cropping the photo. In a method of cropping a photo according to the embodiments of the present disclosure, if more than one face is included in the photo, each face is identified and a crop mark is displayed by setting the crop mark to include the identified faces.

Figure 2:
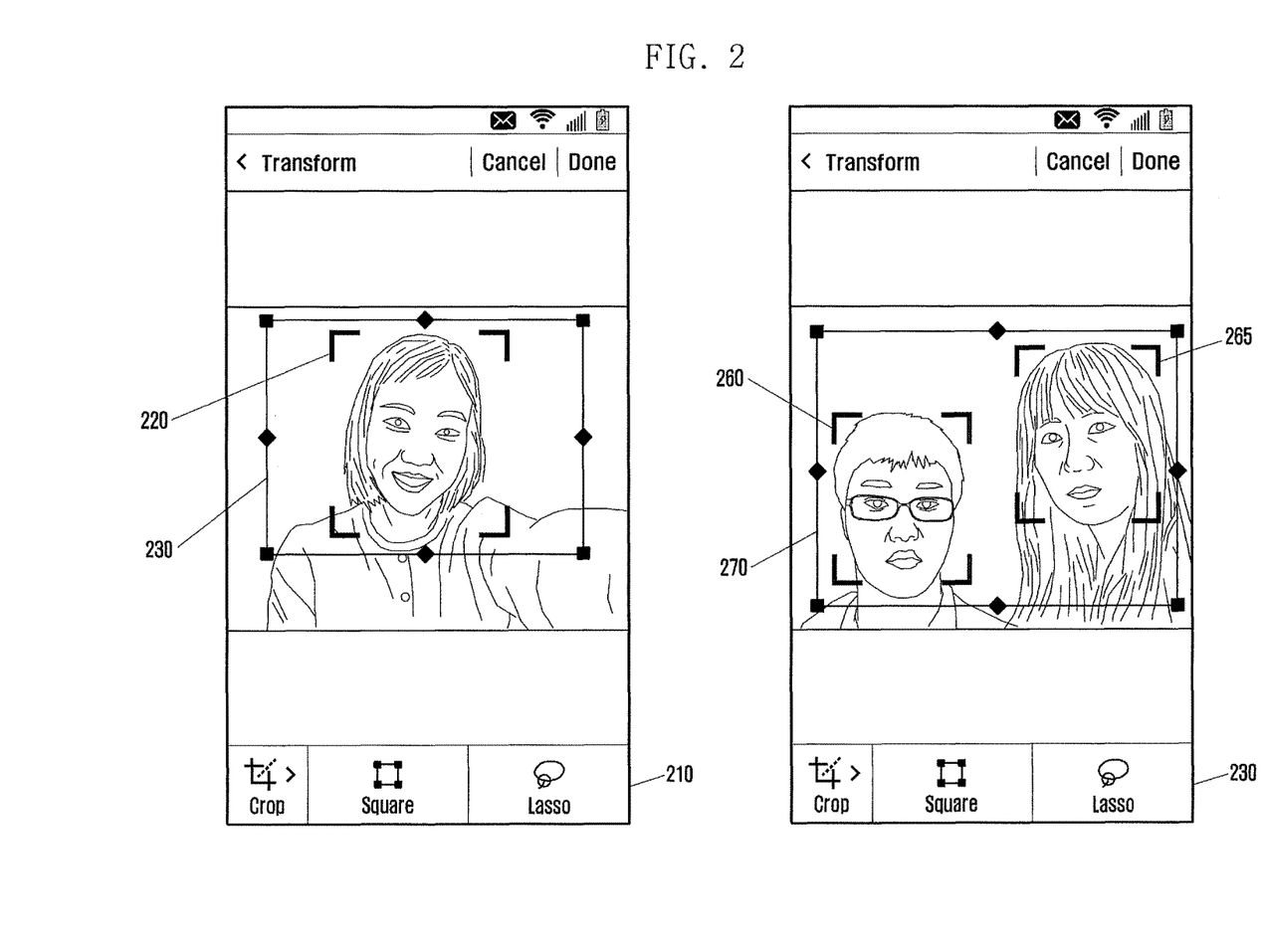
FIG. 2 illustrates examples of setting a crop mark of personal photo in a camera device according to embodiments of the present disclosure.

FIG. 2 illustrates examples of setting a crop mark of personal photo in a camera device according to embodiments of the present disclosure.

Referring to FIG. 2, if a user selects a Crop button in an editing mode through the input unit 140, the control unit 100 detects the user selection and recognizes a face area of person in a photo displayed in the display unit 130. Generally, the face recognition performed by face area extraction distinguishes where the face is located, and the face recognition identifies whose face is found in the extracted face area. Here, the face area extraction can use information such as brightness, movement, color, and location estimation of eyes (nose, mouth, and ears) to distinguish between the face and the background, and can use multiple information due to various parameters. Namely, in order to correctly extract a face area, a method of collecting and compensating more than one kind of information is used. In the embodiments of the present disclosure, the control unit 100 includes a face recognizer having a face area extracting function which distinguishes a location of the face in the whole photo.

The control unit 100 decides how many persons are in a photo through the face recognition. If only one person exists in a photo as shown in screen 210 of FIG. 2, the control unit 100 recognizes a face area 220 in the photo, and controls to display a crop mark 230 in a size of including the face area. By recognizing a face of person in the photo, an image including a face area in a photo can be cropped even though the location of person's face differs. If more than one person exists in a photo as shown in screen 230 of FIG. 2, the control unit 100 recognizes face areas 260, 265 of each person by executing face recognition operation in the photo, and sets and displays a crop mark 270 so that all the identified face areas are included.

Therefore, the cropping according to the embodiments of the present disclosure can set a crop mark including a face area of person in a photo regardless of the location of a person's face in the photo, and can further set a crop mark including face areas by recognizing a face area of each person regardless of the number of persons. If the user generates a crop command after identifying a crop mark in the photo displayed in the display unit 130, the control unit 100 crops an image in the crop mark of the displayed photo, and stores the cropped photo according to a user's request.

Figure 3:
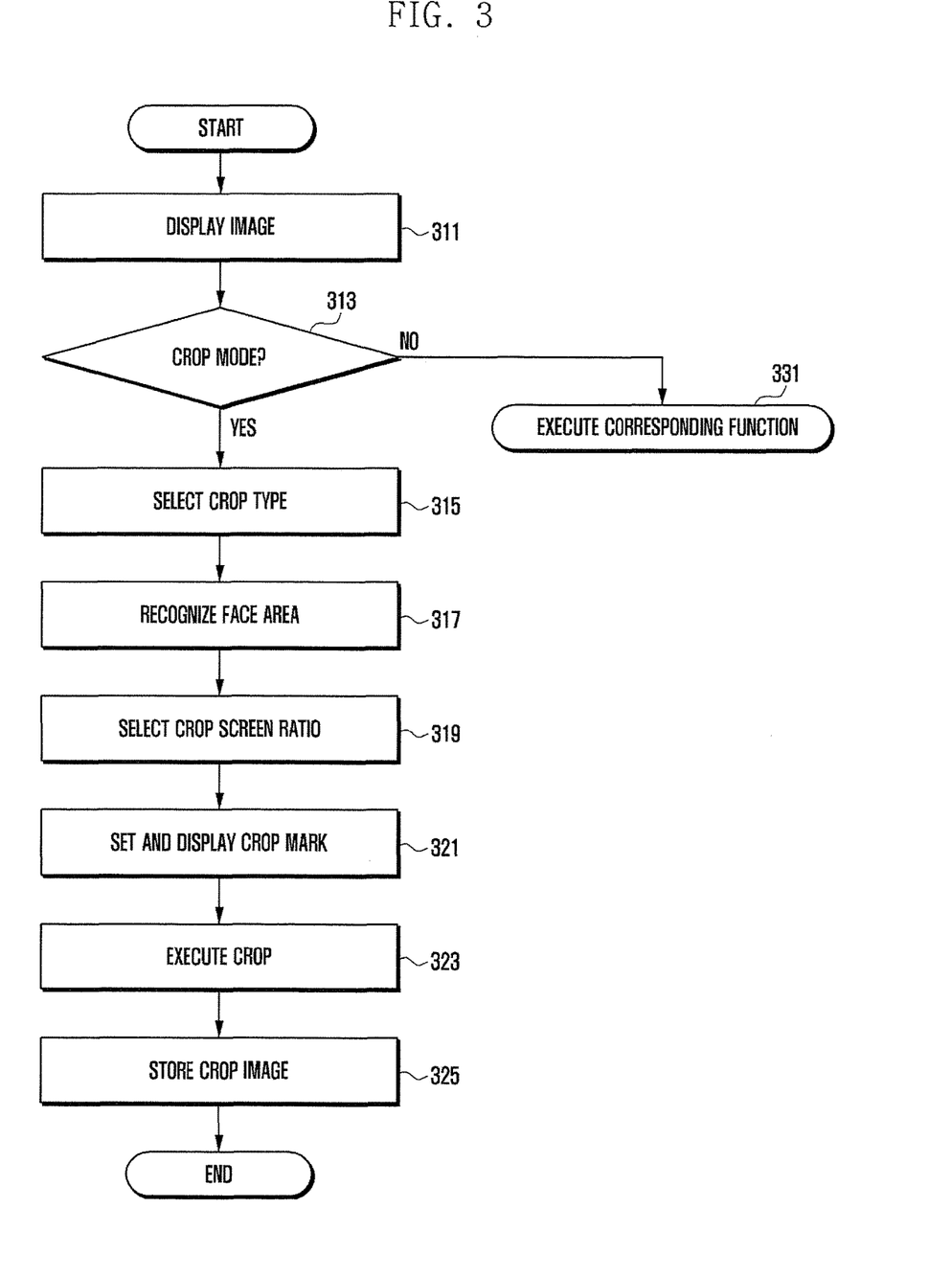
FIG. 3 illustrates a flow chart showing a process of crop operations in a camera device according to embodiments of the present disclosure.
Figure 4:
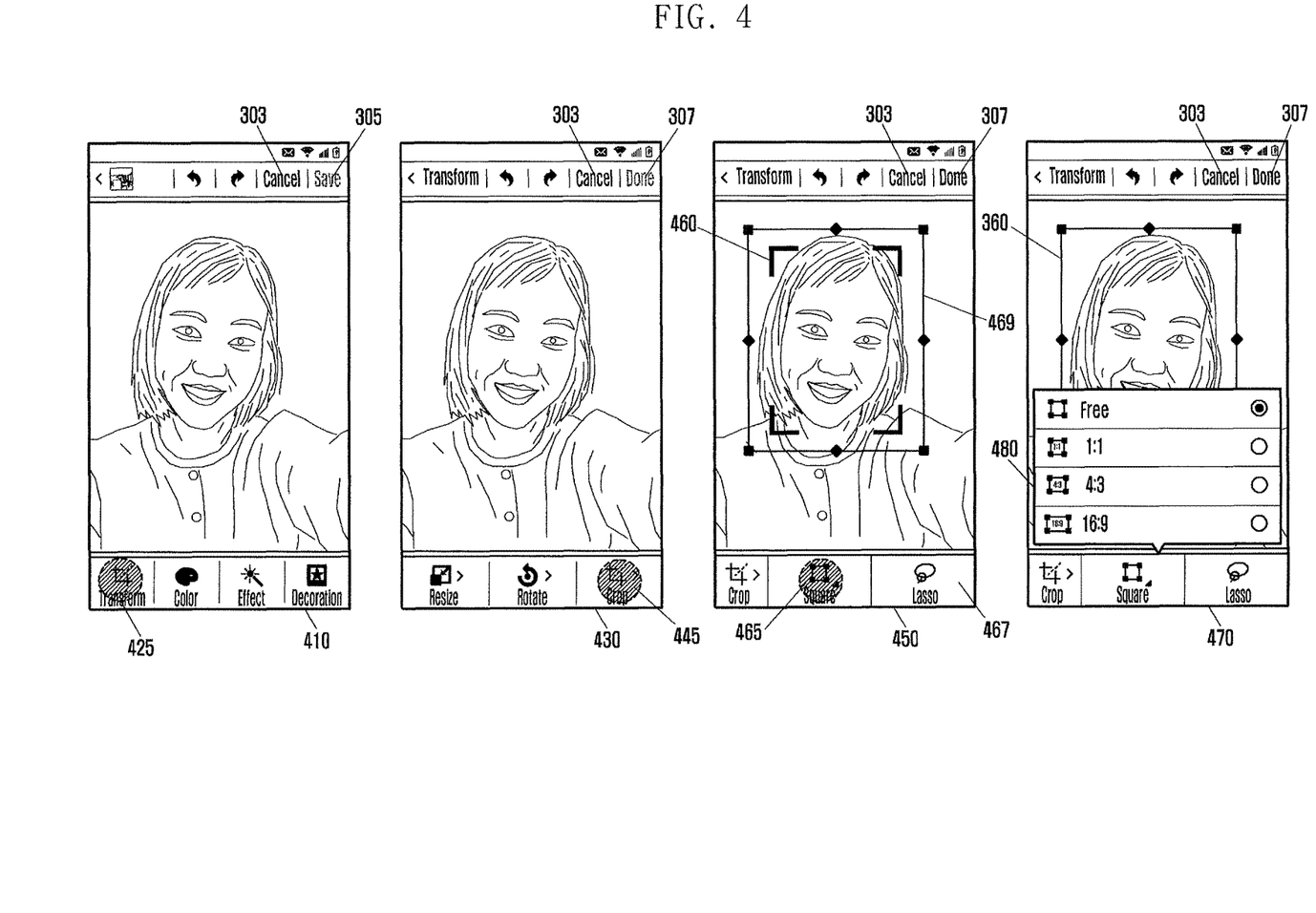
FIG. 4 illustrates a drawing to explain the crop procedure of FIG. 3.

FIG. 3 illustrates a flow chart of a process of crop operations in a camera device according to embodiments of the present disclosure. FIG. 4 illustrates examples of screens to explain the crop procedure of FIG. 3.

Referring to FIGS. 3 and 4, a user firstly selects an edit mode, and a photo to execute the edit mode through the input unit 140. The control unit 100 then controls the display unit 130 to display the photo selected by the user (block 311). Alternatively, the user may select the photo first and execute the edit mode. At block 311, the control unit 100 controls the display unit 130 to display a photo to be edited as shown in screen 410 of FIG. 4, and edit function buttons are displayed at the bottom of the displayed photo in the edit mode. The edit function buttons include a transform button 425 to execute a crop mode according to the embodiment of the present disclosure. If the user touches the transform button 425, the control unit 100 detects the user touch and enters a transform mode as shown in screen 430, and the control unit 100 controls the display unit 130 to display function buttons including a crop button 445 at the bottom of displayed photo. If the user selects the crop button 445, the control unit 100 detects the user selection (block 313), and controls to display a default crop position in the photo according to a crop type selected by the user if the user selects the crop type (block 315). Namely, if the user selects the crop button 445, the control unit 100 controls the display unit 130 to display buttons to decide a crop type at the bottom area of the displayed photo, and the crop button can include a square button 465 and lasso button 467. Here, the square button 465 is a button to set a crop in a rectangular form, and the lasso button 467 is a button to set a crop in an elliptic form. If the user select the square button 465, the control unit 100 controls to display a rectangular default crop position as shown by crop mark 469 at block 315.

Subsequently, the control unit 100 extracts a face area of person included in the photo and locates a crop position in the extracted face area by analyzing the displayed photo (block 317). The control unit 100 then controls to display a pop-up window 480 to select a crop ratio (block 319). Here, the crop ratio can be freely set to a screen ratio of 1:1, 4:3, or 16:9 (fixed ratio to crop an image of recognized face area). The pop-up window 480 of FIG. 4 shows an example of selecting a fixed ratio. If a crop ratio is selected as described above, the control unit 100 detects the crop ratio selection, and controls to display a crop mark by setting the crop mark according to the selected crop type and ratio (block 321). In the above state, if the user selects an execution button 485 (Done button 485 of FIG. 4), the control unit 100 detects the user selection, and crops an image in the displayed crop mark (block 323). Subsequently, if the user selects a Save button 305, the control unit 100 detects the selection, and stores the cropped image in the storage unit 110 (block 325). Here, the original image of the cropped crop image can be saved without any change.

However, if the user doesn't select the crop mode, the control unit 100 detects the user selection at block 315, and executes a corresponding function by branching to block 331.

As described above, if a crop mode is selected in the edit mode, the camera device according to the embodiments of the present disclosure recognizes a face area of person included in a displayed image, sets a crop mark including the recognized face area, and crops an image in the crop mark by detecting a crop execution button. If the crop mode is selected, the camera device displays buttons to set a crop type so that a user may select a desired crop type, and displays a menu or pop-up window to set a screen ratio of crop image.

Figure 5:
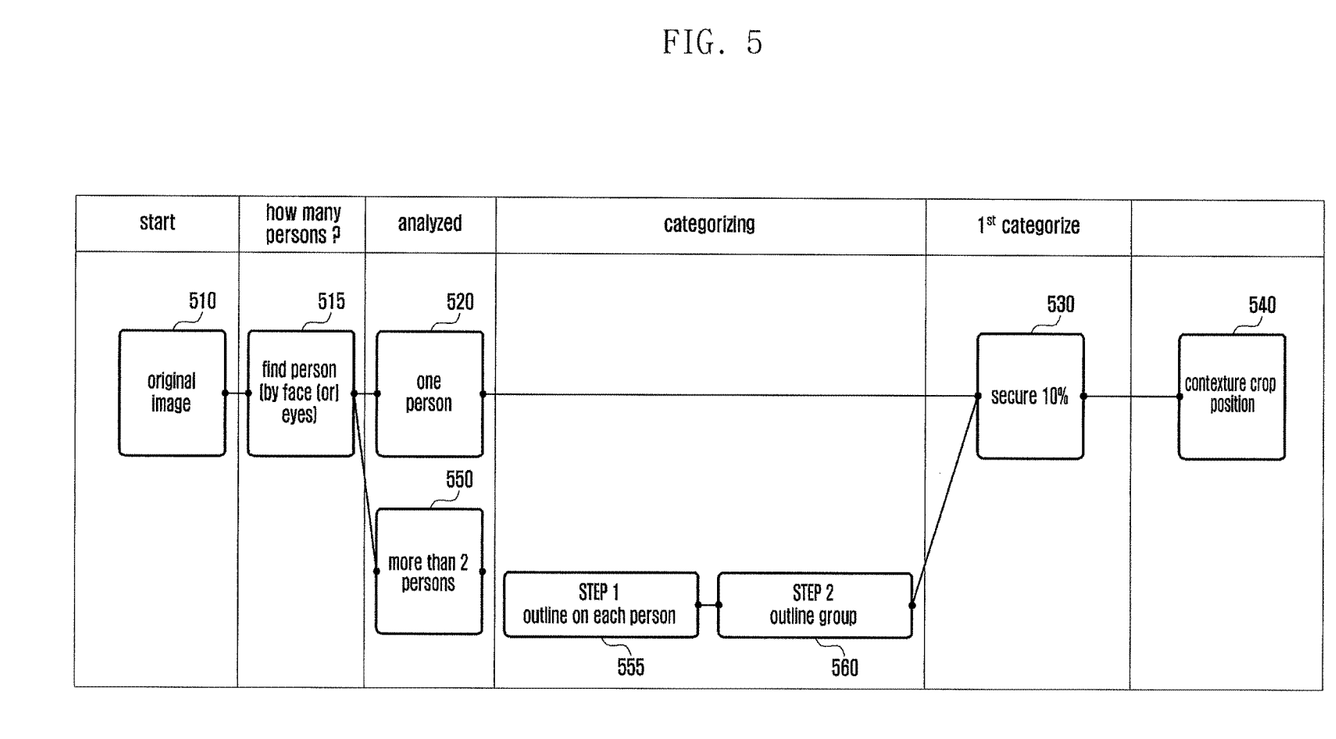
FIG. 5 illustrates a process of setting a crop mark and executing a crop operation corresponding to the number of identified persons in a camera device according to embodiments of the present disclosure.

FIG. 5 illustrates a process of setting a crop mark and executing a crop operation corresponding to the number of identified persons in a camera device according to embodiments of the present disclosure. FIGS. 6A to 6E illustrate examples of setting a crop mark according to the process of FIG. 5. Here, FIGS. 6A to 6E show a process of cropping a photo including 3 persons.

Figure 6A:
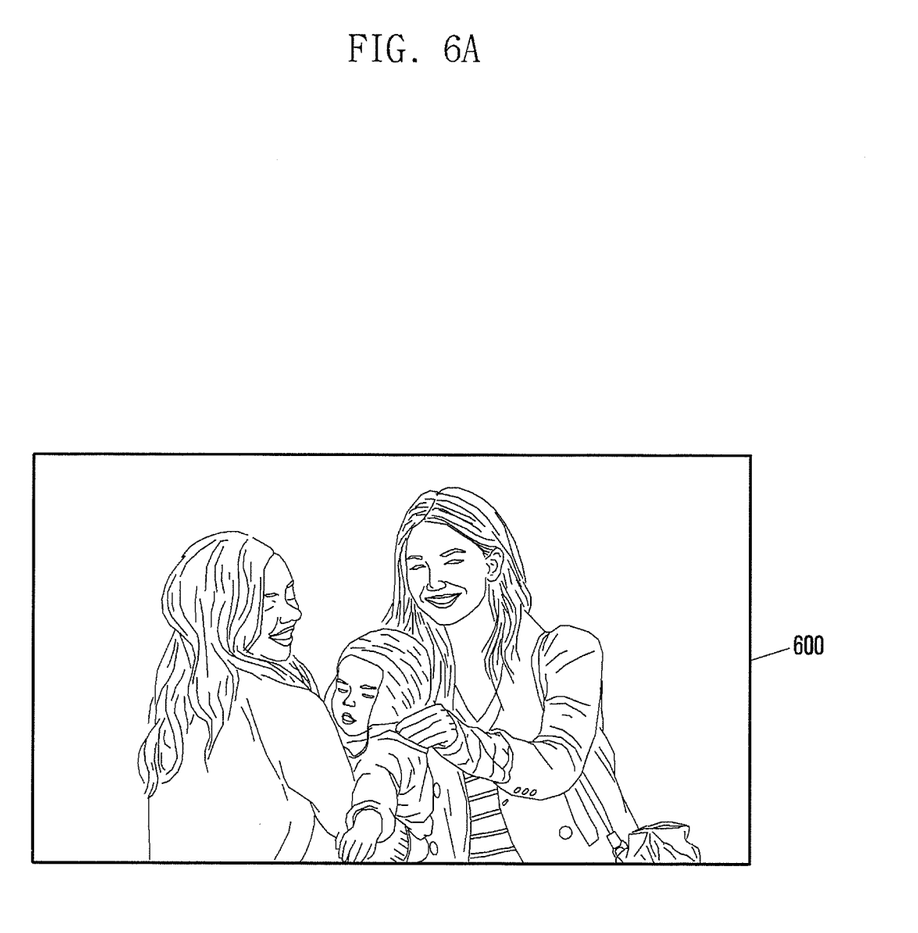
FIGS. 6A to 6E illustrate examples of setting a crop mark according to the process of FIG. 5.

Referring to FIGS. 5 and 6A to 6E, if a user selects an image to execute a crop mode, the control unit 100 controls the display unit 130 to display an original image 600 selected by the user as shown in FIG. 6A (block 510). In the above state, if the user requests for execution of crop mode, the control unit 100 recognizes face areas of persons in the image, and decides the number of persons included in the photo according to the result of recognition (block 515). Here, the method of face recognition can be performed by recognizing face and/or eyes as described above. Hereafter, the crop operations are described for the case of including one person in the photo and for the case of including more than one person in the photo.

Firstly, if one person is recognized in the operation of deciding the number of persons, the control unit 100 recognizes a face area in the photo, and sets a crop mark including the recognized face area (block 520). Here, the user may set a type of crop mark and crop screen ratio. After selecting the crop mark for one person, the control unit 100 expands the crop mark area in a predetermined ratio to provide an allowance in cropping (block 530). The reason for providing the crop mark is to include the whole face area of person in the cropping. Subsequently, the control unit 100 crops an image in the crop mark, and stores the cropped image in the storage unit 110 if the user requests for storing the cropped image (block 540).

Figure 6B:
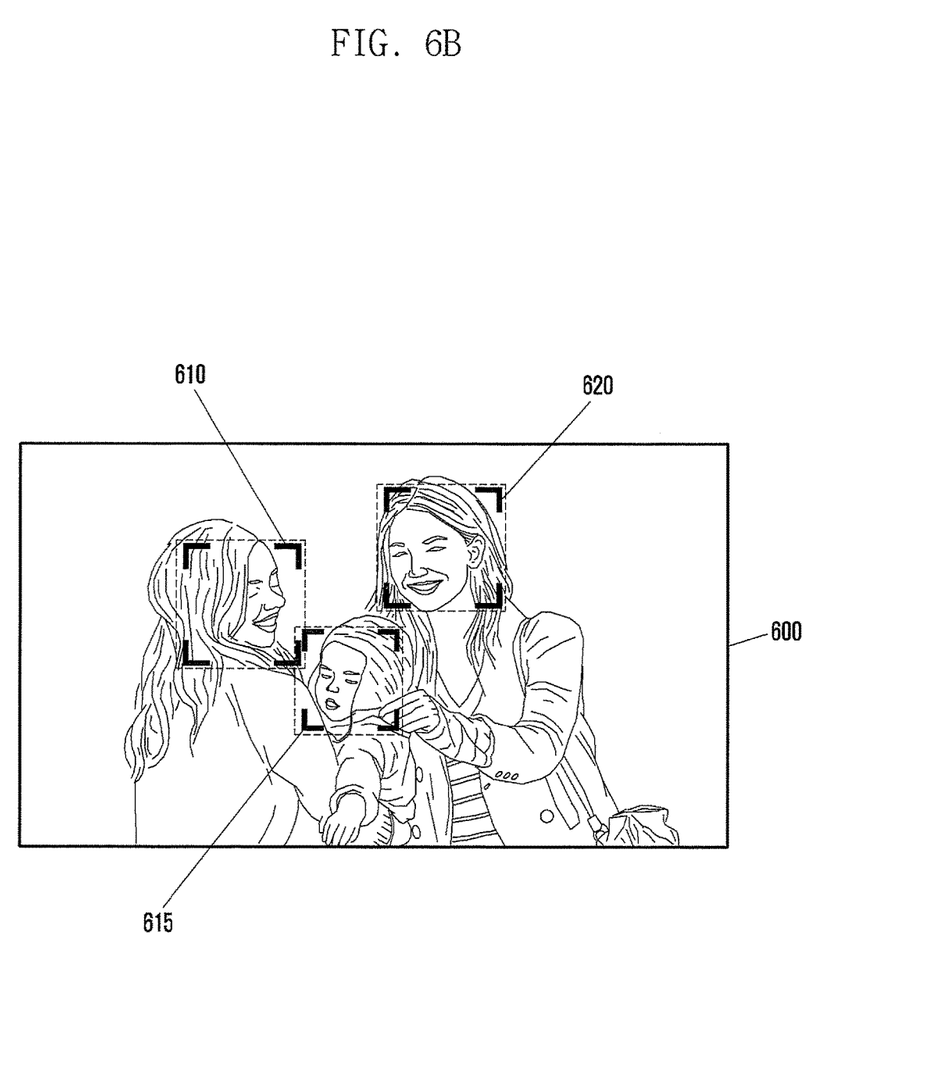
Figure 6C:
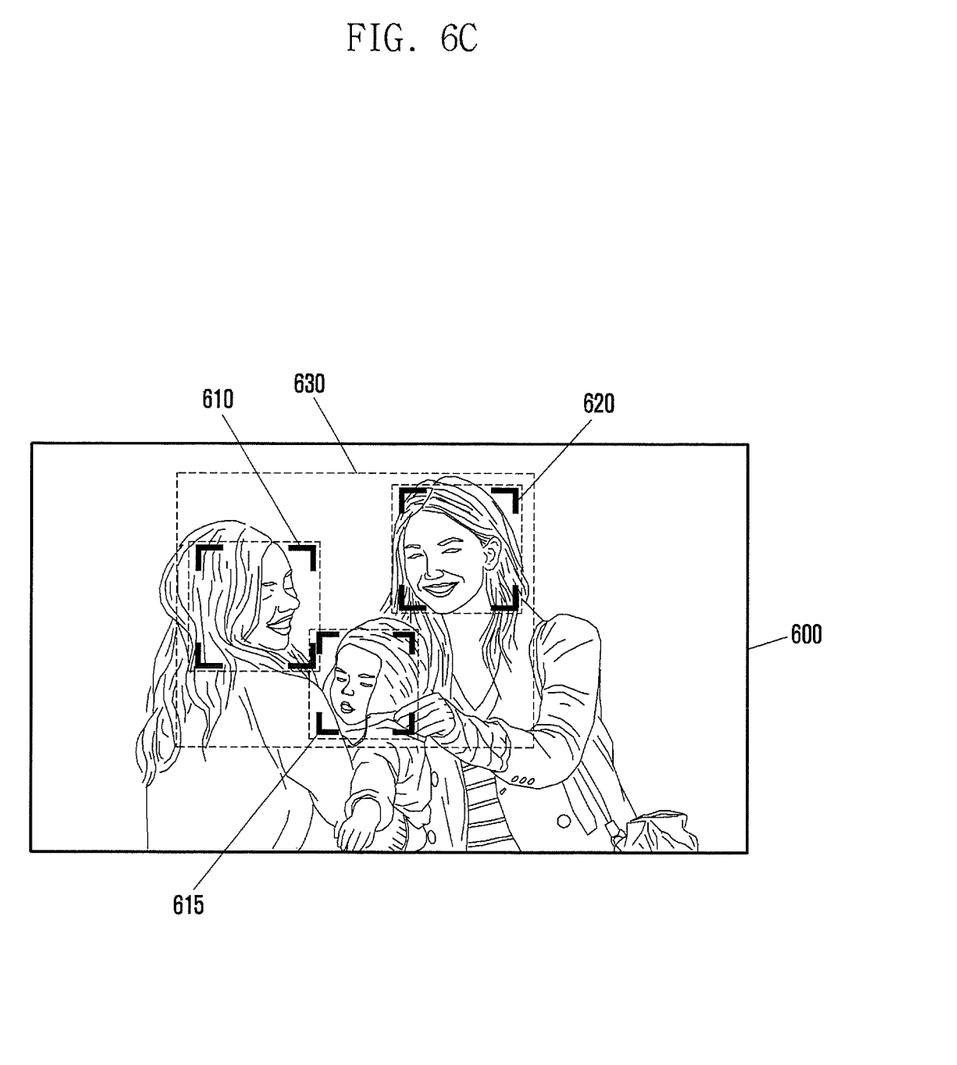

Secondly, if more than one person is recognized in the operation of deciding the number of persons, the control unit 100 performs face recognition in the photo 600 (block 550). Here, the number of persons included in the photo is assumed to be 3 as shown in FIG. 6A. The control unit 100 detects that the photo includes more than one person at block 550, and performs face recognition of each person (i.e., face area extraction). After recognizing the face areas of each person, the control unit 100 controls to display face extraction areas 610, 615, and 620 of each person as shown in FIG. 6B (block 555). Namely, the control unit 100 controls to display each extracted face area 610, 615, and 620 of persons at block 555 as shown in FIG. 6B. Subsequently, the control unit 100 controls to display a crop mark 630 including all the extracted face areas 610, 615, and 620 (block 560). Here, the extracted face areas of persons may individually have different location values in the photo. Namely, when cropping a photo 600 as shown in FIG. 6A, a face area 610 is located at the upper left, a face area 620 is located at the upper right, and a face area 615 is located at the bottom as shown in FIG. 6B. In this case, the control unit 100 controls to display a crop mark 630 of FIG. 6B in the photo for each face area (610, 615, and 620 of FIG. 6B) at block 560. If more than one face area of person is detected, the control unit 100 sets a crop mark 630 by making an imaginary plane circumscribing marked rectangles of detected face areas as shown in FIG. 6C. Namely if more than one face area of person is detected, the control unit 100 processes in the same method as detecting one face area by setting the crop mark including face areas 610, 615, and 620.

Figure 6D:
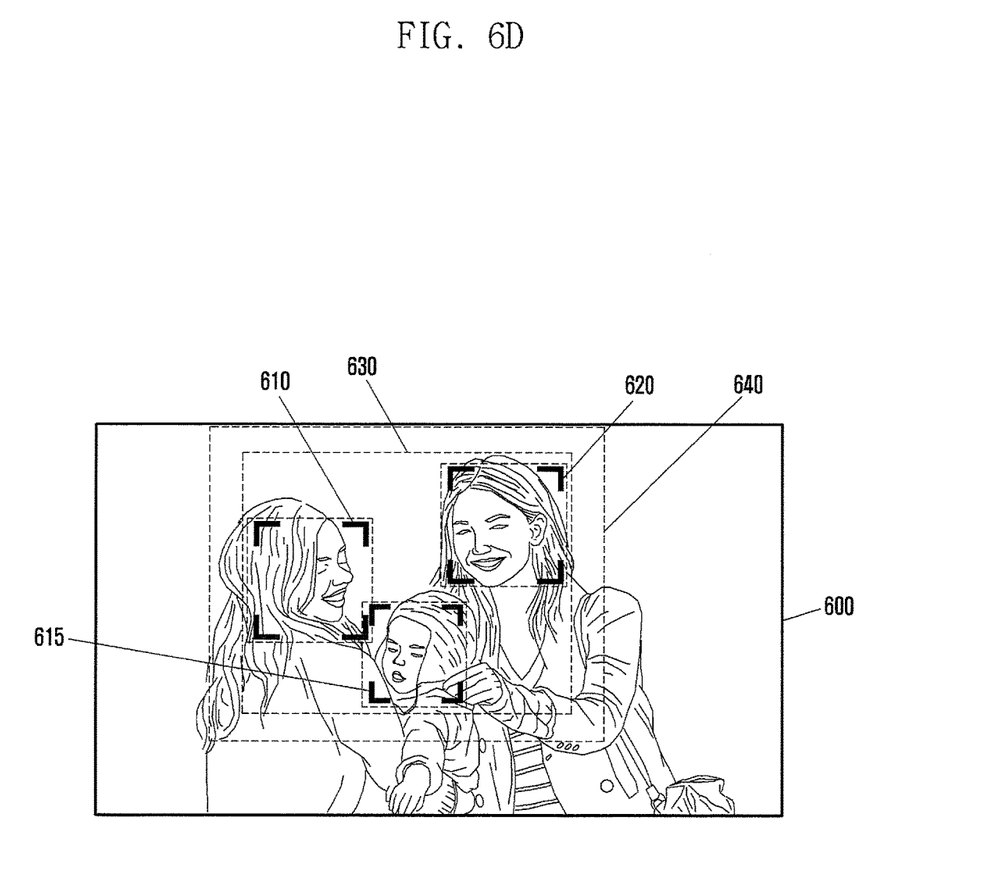
Figure 6E:
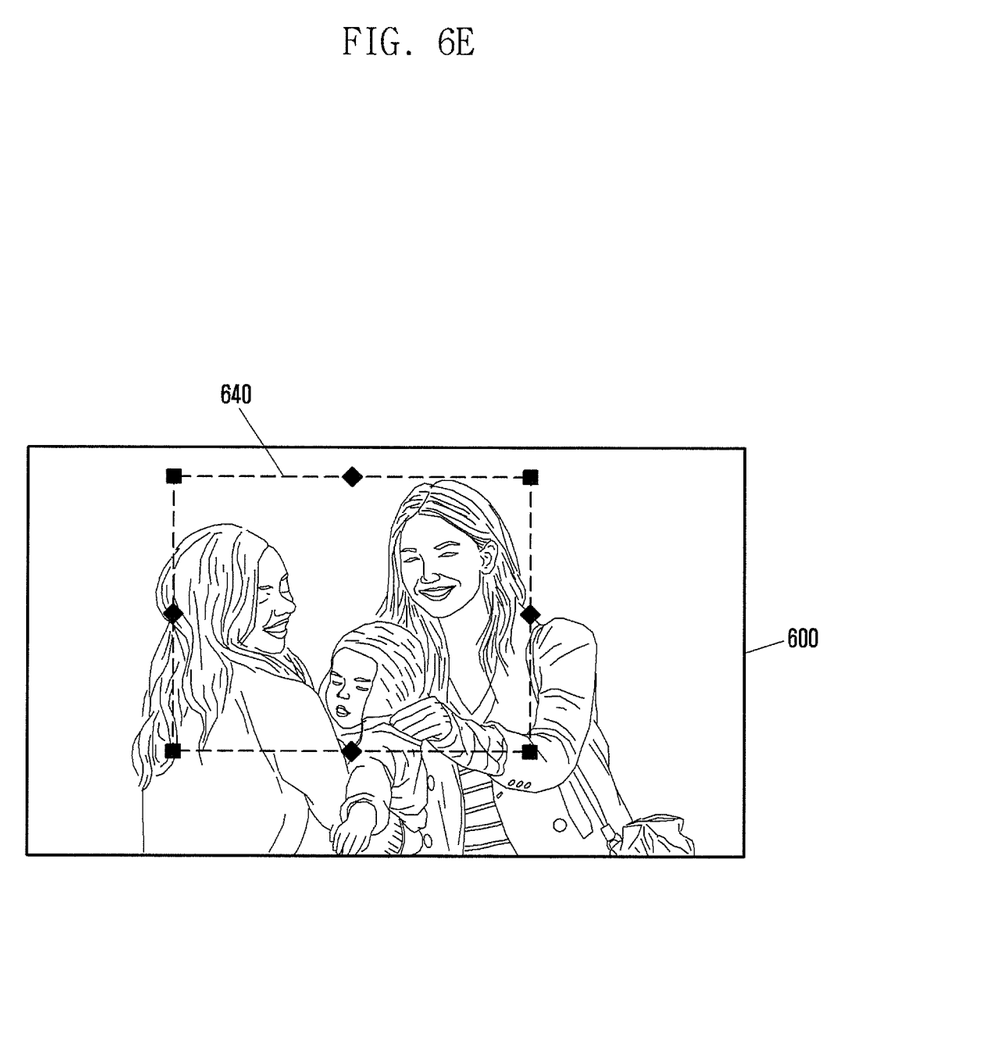

Subsequently, the control unit 100 expands the area of crop mark 630 in a predetermined ratio as shown by crop mark 640 so that the crop mark 630 can have a margin. The margin is provided because a portion of personal face is cropped if the margin is not set when setting a crop area including the face areas. In the embodiments of the present disclosure, the control unit 100 expands the crop mark to have a margin at block 530 after setting the crop mark by face areas. Here, the expansion ratio can be set to about 10%. The control unit 100 then sets an expanded crop mark 640 at block 530, and crops an image in the crop mark 640 at block 540 if the user requests for execution of cropping.

In the setting of a crop mark, the control unit 100 controls to display a menu or pop-up windows to set a desired screen ratio, and sets a crop mark in a screen ratio selected by the user. In this case, the control unit 100 sets the crop mark so that face areas of persons in the photo are included and the screen ratio is identical to that of original image when setting the crop mark at block 530.

Figure 7:
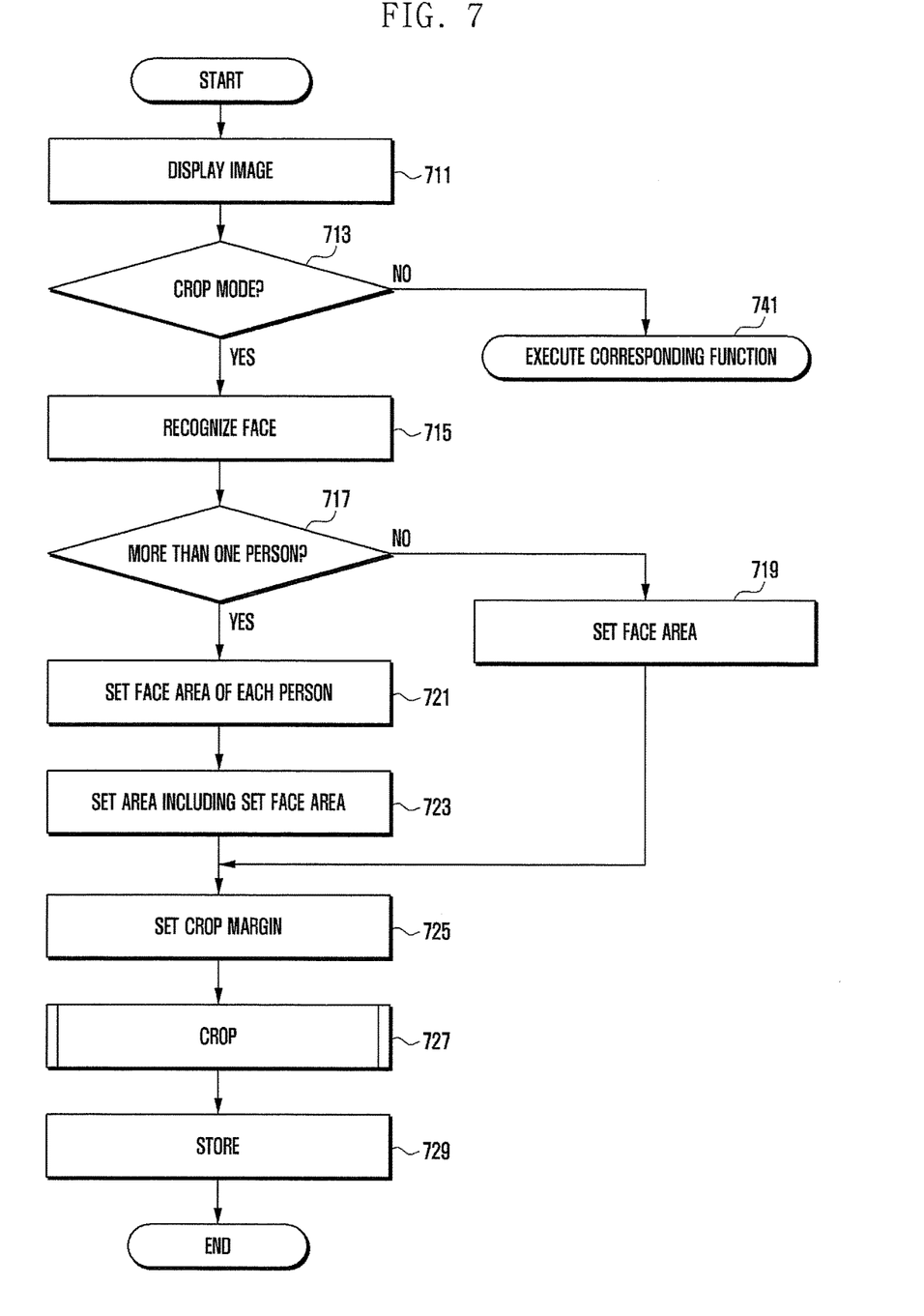
FIG. 7 illustrates a flow chart of a process of cropping an image in a camera device according to embodiments of the present disclosure.

FIG. 7 illustrates a flow chart showing a procedure of cropping an image in a camera device according to embodiments of the present disclosure.

Referring to FIG. 7, a user selects an edit mode and selects a photo to be edited through the input unit 140. The control unit 100 controls the display unit 130 to display the photo selected by the user (block 711). The user may select the photo first then the edit mode as described above. The control unit 100 controls the display unit 130 to display the photo at block 711. The displayed photo can be a photo including one person as shown in screen 410 of FIG. 4 or a photo 600 including more than one person as shown in FIG. 6A. The control unit 100 then recognizes face areas of persons in the photo. Here, cropping can be performed in various types. In this case, the control unit 100 controls to display a crop type before recognizing a face area, and sets the crop type according to a user's selection. Here, the crop mark can be a square type or lasso type as described above.

After recognizing the face area, the control unit 100 checks whether the recognized face area includes more than one face. If one face is recognized, the control unit 100 detects the one face recognition (block 717), and controls to display a crop mark by setting the crop mark to include faces areas of persons in the photo (block 719).

If more than one face is recognized, the control unit 100 detects the multiple face recognition at block 717, and controls to set and display face areas 610, 615, and 620 of each person after recognizing faces in the photo as shown in FIG. 6B (block 721). After recognizing the face areas of each person, the control unit 100 sets and controls to display a crop mark including all the face areas of each person (block 723). The face areas extracted from each person can have different location value in the photo. For example, in the case of taking a photo including a tall person and short person, case of taking a photo including a person hugging a baby, case of taking a photo including some persons sitting and the others standing, and case of taking a group photo including more than one row, face areas of persons in the photo can have different location values in the up, down, right, and left directions in the photo. In the embodiments of the present disclosure, a crop mark is set so that all the face areas of persons in the photo are included for all the situations of the above cases.

After setting a crop mark 630 including face areas in the photo image at block 723 or block 719, the control unit 100 expands the crop mark in a predetermined ratio so that a face area is not cropped (block 725). Namely, the control unit 100 expands the crop mark in a predetermined ratio so that the crop mark has a margin after setting the crop mark according to the face areas. Here, the expansion ratio can be set to about 10%. If a crop execution is requested in a state of displaying the crop mark in the photo, the control unit 100 crops an image in the crop mark 640 (block 727), and stores the cropped image in the storage unit 110 if storing the cropped image is requested (block 729).

As described above, the crop mark includes all the face areas 610, 615, 620 of each person, and sets a crop mark by adding a margin so that the face area of a person is not cropped. Further, a screen ratio (or size) of crop mark is set to include a face area, and can be set identical to the screen ratio of original image 600 (photo) and including the face area. The control unit 100 displays a menu or pop-up windows to set a crop screen ratio, and sets the screen ratio (or size) of crop mark according to a screen ratio selected by the user.

Figure 8:
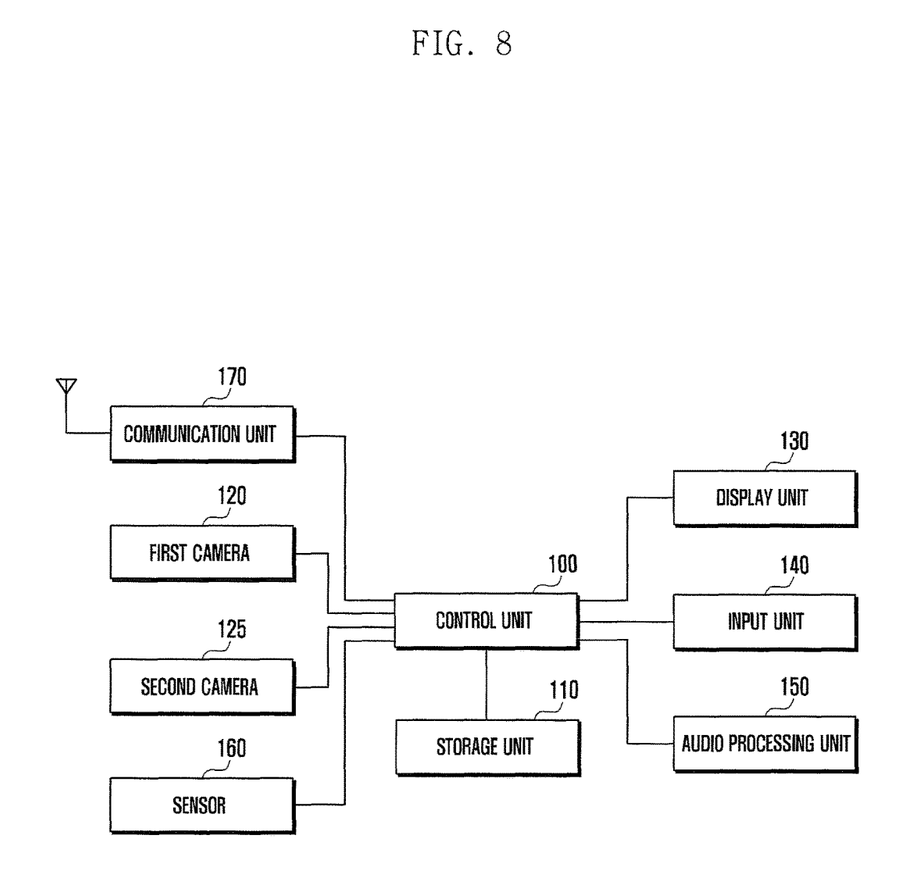
FIG. 8 illustrates a block diagram of a configuration of portable terminal to crop an image according to embodiments of the present disclosure.

FIG. 8 illustrates a block diagram of a configuration of a portable terminal to crop an image according to embodiments of the present disclosure. Here, the portable terminal can be a mobile phone including a smart phone, MP3 terminal, tablet PC, and various digital equipments having a camera.

Referring to FIG. 8, a communication unit 170 performs a communication function with a base station or internet server. The communication unit 170 is configured with a transmitter up-converting a frequency of transmitting signal and amplifying an electric power, and a receiver low-noise amplifying and down-converting a frequency of receiving signal. Further, the communication unit 170 includes a modulator and a demodulator. The modulator transmits a transmitting signal to the transmitter by modulating the signal, and the demodulator demodulates a signal received through the receiver. Here, the modulator and demodulator can be an LTE, WCDMA, GSM, WIFI, WIBRO, NFC, or Bluetooth. In the embodiments of the present disclosure, the communication unit 170 is configured with LTE, WIFI, and Bluetooth devices.

A first camera 120 is a camera disposed at the rear side of the portable terminal, and can photograph a high resolution image. A second camera 125 is a camera disposed at the front side of the portable terminal, and can photograph a lower resolution image compared to the first camera.

A control unit 100 controls the general operation of the portable terminal, and controls an image crop operation according to an embodiment of the present disclosure.

A storage unit 110 has a program memory storing an operating program of the portable terminal and a program according to embodiments of the present disclosure, and a data memory storing tables for the operation of portable terminal and data generated while executing a program.

A display unit 130 displays information of executing application under the control of the control unit 100. The display unit 130 can be configured with an LCD or OLED. An input unit 140 is provided with a capacitive type or resistive type, and outputs location information of user's touch (finger touch) to the control unit 100. Further, the input unit 140 can include an EMR sensor pad, and detects a pen touch input to transmit to the control unit 100. Here, the display unit 130 and the input unit 140 can be integrated into one unit.

An audio processing unit 150 processes a voice signal generated in a communication mode and processes an audio signal generated in a photographing mode of the camera. A sensor 160 can include various sensors for detecting movement of the portable terminal. The sensor 160 can be configured with an acceleration sensor, geomagnetic sensor, and/or location detection sensor.

In the portable terminal having the above configuration, the control unit 100 obtains a still image or moving image by controlling the first camera 120 and/or second camera 125. Further, the control unit 100 performs an edit function including a crop mode. Here, a crop edit function according to the embodiments of the present disclosure extract a face area of person from an image and generates a crop image including all the extracted face areas of persons. The control unit 100 controls the display unit 130 to display the image selected in an edit mode and to display soft buttons to select a crop type and crop ratio at the bottom of image display area while the user executes a crop mode.

Further, the control unit 100 firstly extracts face areas of persons included in the photo if a crop mode is selected. Here, the face areas can be extracted by detecting eyes, nose, and mouth, and by using color, brightness, and contour components of the surroundings. Subsequently, the control unit 100 sets a crop mark according to the number of extracted face areas after extracting the face area. If only one person is included in the photo, a crop mark is set to have a predetermined margin ratio corresponding to the extracted face area. If a crop operation is requested through the input unit 140, the control unit 100 generates a crop image by cropping an image in the set crop mark, and controls the display unit 130 to display the crop image and the storage unit 110 to store the crop image. However, if more than one person is included in the photo, the control unit 100 controls to display the extracted face areas, and generates a crop mark including all the displayed face areas. In the case of personal photo including more than one person, the crop mark can be set by the method of FIG. 6C, and the crop mark can be expanded to have a predetermined margin ratio.

The control unit 100 selects a crop type according to a user's selection. Further, the crop mark can be set according to the face area, set to a screen ratio of original image, or set according to the user's selection. Accordingly, the crop image includes all the face areas of persons included in the photo, and the crop type or crop screen ratio can be set according to the user's selection.

Although the present disclosure has been described with embodiments, various changes and modifications may be suggested to one skilled in the art. It is intended that the present disclosure encompass such changes and modifications as fall within the scope of the appended claims.

What is claimed is:

1. A method for processing an image in an apparatus having a camera, the method comprising:
    displaying an image having a first aspect ratio on a display having a second aspect ratio different from the first aspect ratio;
    in response to detecting a signal indicating that a crop mode is selected, identifying, by a control unit, a face area in the image;
    setting a crop mark according to the identified face area, the crop mark being configured to circumscribe the identified face area;
    displaying the crop mark;
    in response to detecting a signal requesting to store a crop image, expanding the crop mark, by a predetermined ratio, to include a margin for the crop mark; and
    storing the crop image by cropping the image according to the expanded crop mark when a crop execution is requested, wherein an aspect ratio of the crop image is identical to the first aspect ratio.

2. The method of claim 1, wherein when a plurality of face areas is identified, the setting the crop mark further comprises:
    displaying each of the identified face areas; and
    setting and displaying the crop mark by connecting an imaginary line circumscribing the displayed face areas.

3. The method of claim 1, wherein when the image includes only one face, the predetermined ratio corresponds to an extracted face area.

4. The method of claim 1, wherein expanding the crop mark expands the crop mark by the predetermined ratio of 10%.

5. The method of claim 1, wherein setting the crop mark further comprises:
    displaying a menu for the aspect ratio of the crop image; and
    setting the aspect ratio of the crop image in a selected aspect ratio.

6. The method of claim 1, further comprising:
    setting a crop type of the image when the crop mode is selected.

7. The method of claim 6, wherein the crop type is one of a square type or a lasso type.

8. The method of claim 7, further comprising obtaining the image from one of a still image or a moving image.

9. An apparatus having a camera, the apparatus comprising:
    a display unit configured to display an image having a first aspect ratio, wherein the display unit has a second aspect ratio different from the first aspect ratio;
    an input unit configured to generate signals for a crop mode and crop execution; and
    a control unit configured to:
        in response to detecting a signal indicating that a crop mode is selected, identify a face area in the displayed image,
        set a crop mark according to circumscribing the identified face area in the displayed image,
        display the crop mark,
        in response to detecting a signal requesting to store a crop image, expand the crop mark, by a predetermined ratio, to include a margin for the crop mark, and
        store the crop image by cropping the image according to the expanded crop mark if a signal for crop execution is detected, wherein an aspect ratio of the crop image is identical to the first aspect ratio.

10. The apparatus of claim 9, wherein the control unit is further configured to, in response to identifying a plurality of face areas, display each of the identified face areas, and set and display the crop mark by connecting an imaginary line circumscribing the displayed face areas.

11. The apparatus of claim 9, wherein when the image includes only one face, the predetermined ratio corresponds to an extracted face area.

12. The apparatus of claim 9, wherein the control unit is further configured to expand the crop mark by the predetermined ratio of 10%.

13. The apparatus of claim 9, wherein the control unit is further configured to display buttons to select a crop type of the displayed image in response to detecting a signal for crop type, and set the crop type corresponding to a selected button.

14. The apparatus of claim 13, wherein the crop type is one of a square type or a lasso type.

15. The apparatus of claim 9, wherein the control unit is further configured to display a menu for the aspect ratio of the crop image, and set the aspect ratio of the crop image in a selected aspect ratio.

16. The apparatus of claim 9, wherein the control unit is further configured to obtain the image from one of a still image or a moving image.

17. An apparatus, comprising:
- a display unit configured to display an image having a first aspect ratio, wherein the display unit has a second aspect ratio different from the first aspect ratio;
- a plurality of cameras configured to capture images to be displayed by the display unit;
- an input unit configured to generate signals for a crop mode and crop execution; and
- a control unit configured to:
  - in response to detecting a signal indicating that a crop mode is selected, identify a face area in the image,
  - set a crop mark according to circumscribing the identified face area in the image,
  - display the crop mark,
  - in response to detecting a signal requesting to store a crop image, expand the crop mark, by a predetermined ratio, to include a margin for the crop mark, and
  - store the crop image by cropping the image according to the expanded crop mark if a signal for crop execution is detected, wherein an aspect ratio of the crop image is identical to the first aspect ratio.

18. The apparatus of claim 17, wherein the control unit is further configured to, in response to identifying a plurality of face areas, display each of the identified face areas, and set and display the crop mark by connecting an imaginary line circumscribing the displayed face areas.

\* \* \* \* \*